(12) United States Patent
Kwon et al.

(10) Patent No.: US 8,200,176 B2
(45) Date of Patent: Jun. 12, 2012

(54) MOBILE TERMINAL AND METHOD OF CONTROLLING BROADCAST IN MOBILE TERMINAL

(75) Inventors: Tae Jung Kwon, Seoul (KR); Sung-Chul Yang, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 496 days.

(21) Appl. No.: 12/468,728

(22) Filed: May 19, 2009

(65) Prior Publication Data

US 2009/0318075 A1 Dec. 24, 2009

(30) Foreign Application Priority Data

Jun. 23, 2008 (KR) .................. 10-2008-0059223

(51) Int. Cl.
  *H04B 1/18* (2006.01)
(52) U.S. Cl. .................................................. 455/150.1
(58) Field of Classification Search .................. None
  See application file for complete search history.

(56) References Cited

U.S. PATENT DOCUMENTS

| | | | |
|---|---|---|---|
| 2006/0055831 A1 | 3/2006 | Onomatsu | |
| 2008/0022303 A1 | 1/2008 | Lu et al. | |
| 2008/0134244 A1* | 6/2008 | Yamamoto | 725/44 |
| 2008/0134280 A1 | 6/2008 | Kim | |
| 2008/0172698 A1* | 7/2008 | Berger et al. | 725/50 |

FOREIGN PATENT DOCUMENTS

| | | |
|---|---|---|
| EP | 1703726 | 9/2006 |
| EP | 1874046 | 1/2008 |

* cited by examiner

*Primary Examiner* — Lincoln Donovan
*Assistant Examiner* — Sibin Chen
(74) *Attorney, Agent, or Firm* — Lee, Hong, Degerman, Kang & Waimey

(57) ABSTRACT

A mobile terminal and method of controlling a broadcast in a mobile terminal are provided, by which whether to update channel/program relevant data is determined by checking a presence or absence of modification of previously stored channel/program relevant data in a simple manner. The present invention includes a memory storing channel/program relevant data, a wireless communication unit receiving first channel/program relevant data, and a controller determining whether the received first channel/program relevant data matches first channel/program relevant data stored in the memory, controlling the wireless communication unit to receive entire channel/program relevant data if the received first channel/program relevant data does not match the stored first channel/program relevant data, and updating the stored first channel/program relevant data with reference to the received entire channel/program relevant data.

21 Claims, 19 Drawing Sheets

FIG. 6

| Time offset section (TOT) | |
|---|---|
| Syntax | No. of bits |
| time_offset_section() { | |
|     table_id | 8 |
|     setcion_syntax_indicator | 1 |
|     reserved_future_use | 1 |
|     reserved | 2 |
|     section_length | 12 |
|     UTC_time | 40 |
|     reserved | 1 |
|     descriptors_loop_length | 12 |
|     for(i=0; i<N; i++){ | |
|     descriptor() | |
|     } | |
|     CRC_32 | 32 |
| } | |

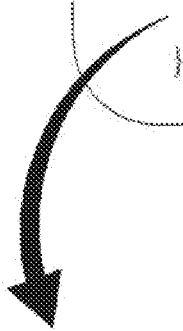

| Syntax | Number of bits | Identifier |
|---|---|---|
| local_time_offset_descriptor() { | | |
| descriptor_tag | 8 | uimsbf |
| descriptor_length | 8 | uimsbf |
| for (i=0; i<N; i++) { | | |
| country_code | 24 | bslbf |
| country_region_id | 6 | bslbf |
| reserved | 1 | bslbf |
| local_time_offset_polarity | 1 | bslbf |
| local_time_offset | 16 | bslbf |
| time_of_change | 40 | bslbf |
| next_time_offset | 16 | bslbf |
| } | | |
| } | | |

FIG. 7

| Network Information section (NIT) | |
|---|---|
| Syntax | No. of bits |
| network_information_section() { | |
|     table_id | 8 |
|     section_syntax_indicator | 1 |
|     reserved_future_use | 1 |
|     section_length | 2 |
|     network_id | 12 |
|     reserved | 16 |
|     version_number | 2 |
|     current_next_indicator | 5 |
|     section_number | 1 |
|     last_section_number | 8 |
|     reserved_future_use | 8 |
|     network_descriptors_length | 4 |
|     for(i=0; i<N; i++){ | 12 |
|       descriptor() | |
|     } | |
|     reserved_future_use | 4 |
|     transport_stream_loop_length | 12 |
|     for(i=0; i<N; i++){ | |
|       transport_stream_id | 16 |
|       original_network_id | 16 |
|       reserved_future_use | 4 |
|       transport_descriptors_length | 12 |
|       for(j=0; j<N; j++){ | |
|         descriptor() | |
|       } | |
|     } | |
|     CRC_32 | 32 |
| } | |

FIG. 8

| Service description section (SDT) | |
|---|---|
| Syntax | No. of bits |
| service_description_section(){ | |
|     table_id | 8 |
|     section_syntax_indicator | 1 |
|     reserved_future_use | 1 |
|     reserved | 2 |
|     section_length | 12 |
|     transport_stream_id | 16 |
|     reserved | 2 |
|     version_number | 5 |
|     current_next_indicator | 1 |
|     section_number | 8 |
|     last_section_number | 8 |
|     original_network_id | 16 |
|     reserved_future_use | 16 |
|     for(i=0; i<N; i++){ | |
|         service_id | 16 |
|         reserved_future_use | 6 |
|         EIT_schedule_flag | 1 |
|         EIT_present_following_flag | 1 |
|         running_status | 3 |
|         free_CA_mode | 1 |
|         descriptors_loop_length | 12 |
|         for(j=0; j<N; j++){ | |
|         transport_descriptors_length | |
|         for(j=0; j<N; j++){ | |
|             descriptor() | |
|         } | |
|     } | |
|     CRC_32 | 32 |
| } | |

FIG. 9

| Program association section (PAT) Syntax | No. of bits |
|---|---|
| program_association_section() { | |
|     table_id | 8 |
|     section_syntax_indicator | 1 |
|     '0' | 1 |
|     reserved | 2 |
|     section_length | 12 |
|     transport_stream_id | 16 |
|     reserved | 2 |
|     version_number | 5 |
|     current_next_indicator | 1 |
|     section_number | 8 |
|     last_section_number | 8 |
|     for (j=0; j<N; j++) { | |
|         program_number | 16 |
|         reserved | 3 |
|         if(program_number=='0' { | |
|             network_PID | 13 |
|         } | |
|         else { | |
|         program_map_PID | 13 |
|         } | |
|     } | |
|     CRC_32 | 32 |
| } | |

FIG. 10

| Transport stream program map section (PMT) Syntax | No. of bits |
|---|---|
| TS_program_map_section() { | |
|     table_id | 8 |
|     section_syntax_indicator | 1 |
|     '0' | 1 |
|     reserved | 2 |
|     section_length | 12 |
|     program_number | 16 |
|     reserved | 2 |
|     version_number | 5 |
|     current_next_indicator | 1 |
|     section_number | 8 |
|     last_section_number | 8 |
|     reserved | 3 |
|     PCR_PID | 13 |
|     reserved | 4 |
|     program_info_length | 12 |
|     for (i=0; i<N; i++) { | |
|         descriptor() | |
|     } | |
|     for (i=0; i<N1; i++) { | |
|         stream_type | |
|         reserved | |
|         elementary_PID | |
|         reserved | |
|         ES_info_length | |
|         for (j=0; j<N2; j++) { | |
|             descriptor() | |
|         } | |
|     } | |
|     CRC_32 | 32 |
| } | |

MOBILE TERMINAL AND METHOD OF CONTROLLING BROADCAST IN MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2008-0059223, filed on Jun. 23, 2008, the contents of which is incorporated by reference herein in its entirety.

FIELD OF THE INVENTION

The present invention is directed to a mobile terminal, and more particularly, to a mobile terminal and method of controlling a broadcast in a mobile terminal. Although the present invention is suitable for a wide scope of applications, it is particularly suitable for a mobile terminal having a broadcast receiving function.

DESCRIPTION OF THE RELATED ART

A mobile terminal is a device which may be configured to perform various functions. Examples of such functions include data and voice communications, capturing images and video via a camera, recording audio, playing music files via a speaker system, and displaying images and video on a display. Some mobile terminals include additional functionality which supports game playing, while other mobile terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

In a conventional broadcast receiving terminal, at least one frequency band having at least one assigned channel is scanned when initially entering a broadcast mode or receiving a user selection operation. It is then possible to perform a broadcast receiving operation and a broadcast outputting operation using channel/program relevant data obtained as a result of the scan.

The broadcast receiving terminal establishes a database of the channel/program relevant data obtained as a result of the scan. The broadcast receiving terminal performs the broadcast receiving and outputting operations using the stored channel/program relevant data when entering a broadcast mode.

The broadcast receiving terminal is able perform a frequency band scan operation according to a selection made by a user if broadcast receiving and outputting operations using the stored channel/program relevant data are impossible. The broadcast receiving terminal is then able to perform the broadcast receiving and outputting operations using channel/program relevant data obtained as a result of the frequency band scan operation. However, the conventional broadcast receiving terminal needs each user selection operation to update previously stored channel/program relevant data.

A scheme for updating channel/program relevant data according to a presence or absence of modifications of previously stored channel/program relevant data has not been provided when the broadcast receiving and outputting operations are impossible. A scheme for updating channel/program relevant data by determining a presence or absence of modifications of previously stored channel/program relevant data in a simple manner is needed.

SUMMARY OF THE INVENTION

In one aspect of the present invention, a mobile terminal having a broadcast receiving feature is provided. The mobile terminal includes a memory for storing channel/program relevant data, a wireless communication unit for receiving first channel/program relevant data and a controller for determining whether the received first channel/program relevant data matches first channel/program relevant data stored in the memory, controlling the wireless communication unit to receive entire channel/program relevant data if the received first channel/program relevant data does not match the stored first channel/program relevant data, and updating the stored first channel/program relevant data with reference to the received entire channel/program relevant data.

It is contemplated that the wireless communication unit scans one or more frequency bands and the controller selects a frequency band for providing the first channel/program relevant data from the scanned one or more frequency bands. It is further contemplated that the controller selects a first scanned frequency band, a frequency band having best signal strength or a user selected frequency band from the one or more scanned frequency bands.

It is contemplated that the wireless communication unit scans a last frequency band to which a last used channel among one or more previously-used channels is assigned and the controller selects the last frequency band as the frequency band for providing the first channel/program relevant data if the last frequency band is available and the controller controls the wireless communication unit to scan the one or more other frequency bands if the last frequency band is not available. It is further contemplated that the wireless communication unit scans the one or more frequency bands to which at least one previously-used channel is assigned according to a control signal from the controller.

It is contemplated that the controller controls the wireless communication unit to scan the entire frequency bands if the one or more frequency bands to which the at least one previously-used channel is assigned is not available. It is further contemplated that the controller controls the wireless communication unit to perform a scan operation on the one or more frequency bands if at least broadcast mode entry, a user selection operation input or unavailable broadcast viewing is determined.

It is contemplated that the controller determines whether the received first channel/program relevant data matches the stored first channel/program relevant data by using identification information included in the received first channel/program relevant data. It is further contemplated that the identification information includes at least country identification information or time zone identification information if the received first channel/program relevant data is time relevant data, the identification information includes at least network identification information or transport stream identification information if the received first channel/program relevant data is network relevant data, the identification information includes channel identification information or transport stream identification information if the received first channel/program relevant data is channel relevant data and the identification information includes channel identification information, program identification information or program configuration data identification information, if the received first channel/program relevant data is program relevant data.

It is contemplated that the wireless communication unit scans entire frequency bands and receives the entire channel/program relevant data according to a control signal from the controller if the received first channel/program relevant data does not match the stored first channel/program relevant data. It is further contemplated that the mobile terminal further includes a user input unit for receiving a selection from a user and wherein the controller determines whether to update the stored first channel/program relevant data according to the received user selection.

It is contemplated that the received first channel/program relevant data includes unique information for a frequency band providing the first channel/program relevant data. It is further contemplated that the received first channel/program relevant data includes a unique identification value for identifying the received channel/program relevant data.

In another aspect of the present invention, a method of controlling a broadcast in a mobile terminal is provided. The method includes receiving first channel/program relevant data in the mobile terminal, determining whether the received first channel/program relevant data matches stored first channel/program relevant data and receiving entire channel/program relevant data if the received first channel/program relevant data does not match the stored first channel/program relevant data and updating the stored first channel/program relevant data with reference to the received entire channel/program relevant data.

It is contemplated that the method further includes scanning one or more frequency bands and selecting a frequency band for providing the first channel/program relevant data from the one or more scanned frequency bands. It is further contemplated that scanning the one or more frequency bands includes scanning a last frequency band to which a last used channel among one or more previously-used channels is assigned, selecting the frequency band includes selecting the last frequency band as the frequency band for providing the first channel/program relevant data if the last frequency band is available, and the method further includes scanning one or more other frequency bands if the last frequency band is not available.

It is contemplated that scanning the one or more frequency bands includes scanning at least one frequency band to which at least one previously-used channel is assigned. It is further contemplated that the method further includes scanning the entire frequency bands if the at least one frequency band to which the at least one previously-used channel is assigned is not available.

It is contemplated that scanning the one or more frequency bands is performed upon detecting a broadcast mode entry, a user selection operation input or unavailable broadcast viewing. It is further contemplated that determining whether the received first channel/program relevant data matches the stored first channel/program relevant data includes using identification information included in the received first channel/program relevant data.

It is contemplated that the new identification information includes at least country identification information or time zone identification information if the received first channel/program relevant data is time relevant data, the identification information includes at least network identification information or transport stream identification information if the received first channel/program relevant data is network relevant data, the identification information includes at least channel identification information or transport stream identification information if the received first channel/program relevant data is channel relevant data and the identification information includes at least channel identification information, program identification information or program configuration data identification information if the received first channel/program relevant data is program relevant data. It is further contemplated that the method further includes scanning entire frequency bands if the received first channel/program relevant data does not match the stored first channel/program relevant data, wherein the entire channel/program relevant data are obtained as a result of scanning the entire frequency bands. Preferably, the method further includes receiving a selection operation from a user, wherein updating the stored first channel/program relevant data includes updating the stored first channel/program relevant data according to the received selection operation.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIGS. 6 to 10 illustrate first channel/program relevant data according to one embodiment of the present invention.

DETAILED DESCRIPTION OF THE PREFERRED EMBODIMENTS

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

Figure 1:
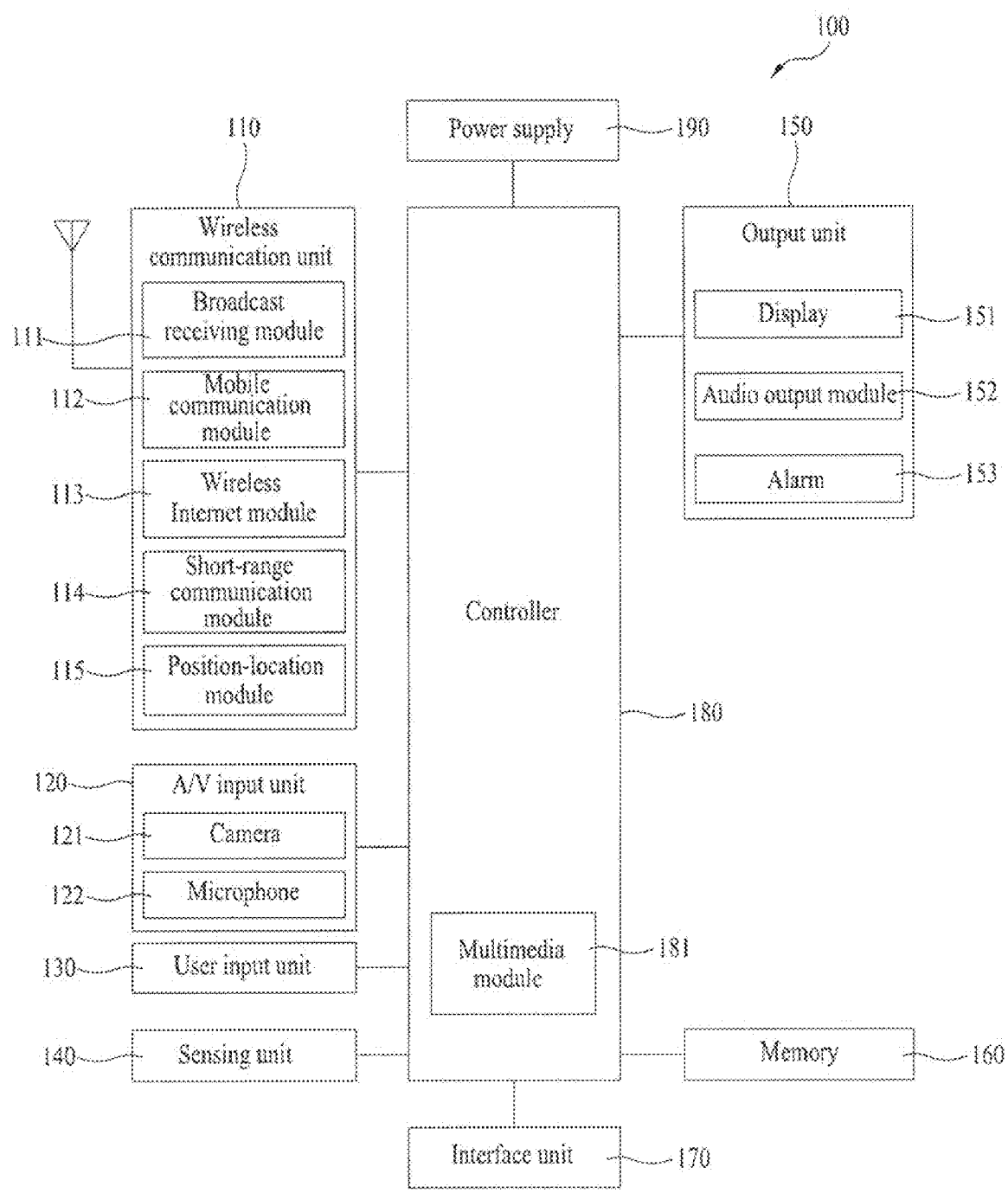
FIG. 1 illustrates a block diagram of a mobile terminal in accordance with an embodiment of the present invention.

FIG. 1 is a block diagram of mobile terminal 100 in accordance with an embodiment of the present invention. The mobile terminal 100 may be implemented using a variety of different types of terminals. Examples of such terminals include mobile phones, user equipment, smart phones, computers, digital broadcast terminals, personal digital assistants, portable multimedia players (PMP) and navigators.

By way of non-limiting example only, further description will be with regard to a mobile terminal 100. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 illustrates a wireless communication unit 110 configured with several commonly implemented components. For example, the wireless communication unit 110 typically includes one or more components that permit wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel or a terrestrial channel. The broadcast managing entity refers generally to a system that transmits a broadcast signal and/or broadcast associated information.

Examples of broadcast associated information include information associated with a broadcast channel, a broadcast program, and a broadcast service provider. For example, the broadcast associated information may include an electronic program guide (EPG) of digital multimedia broadcasting (DMB) and electronic service guide (ESG) of digital video broadcast-handheld (DVB-H).

The broadcast signal may be implemented, for example, as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By way of non-limiting examples, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T).

Receiving multicast signals is also possible. Data received by the broadcast receiving module 111 may be stored in a suitable device, such as the memory 160.

The mobile communication module 112 communicates wireless signals with one or more network entities, such as base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100.

The short-range communication module 114 facilitates relatively short-range communications. Suitable technologies for short-range communication may include, but are not limited to, radio frequency identification (RFID), infrared data association (IrDA), ultra-wideband (UWB), as well at the networking technologies commonly referred to as Bluetooth® and ZigBee®.

The position-location module 115 identifies or otherwise obtains the location of the mobile terminal 100. The position-location module 115 may be implemented using global positioning system (GPS) components that cooperate with associated satellites, network components, and combinations thereof.

The audio/video (A/V) input unit 120 is configured to provide audio or video signal input to the mobile terminal 100. As illustrated, the A/V input unit 120 includes a camera 121 and a microphone 122. If desired, two or more microphones 122 and/or cameras 121 may be used.

The camera 121 receives and processes image frames of still pictures or video. The microphone 122 receives an external audio signal while the mobile terminal 100 is in a particular mode, such as phone call mode, recording mode or voice recognition. This audio signal is processed and converted into digital data.

The mobile terminal 100, and specifically the A/V input unit 120, may include assorted noise removing algorithms to remove noise generated in the course of receiving the external audio signal. Data generated by the A/V input unit 120 may be stored in the memory 160, utilized by the output unit 150, or transmitted via one or more modules of the communication unit 110.

The user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a touch screen display, which will be described in more detail later.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, orientation or acceleration/deceleration of the mobile terminal The mobile terminal 100 may be configured as a slide-type mobile terminal and the sensing unit 140 may sense whether a sliding portion of the mobile terminal is open or closed. The sensing unit 140 may also sense the presence or absence of power provided by the power supply 190 or the presence or absence of a coupling or other connection between the interface unit 170 and an external device.

The interface unit 170 may be implemented to couple the mobile terminal 100 with external devices. Typical external devices include wired/wireless headphones, external chargers, power supplies, earphones, microphones and storage devices configured to store data such as audio, video and pictures. The interface unit 170 may be configured using a wired/wireless data port, a card socket for coupling to a memory card, a device equipped with an identity module, audio input/output ports or video input/output ports.

The identity module is a chip that stores various types of information for identifying or authenticating use authority of the terminal 100. The identity module can include a user identity module (UIM), a subscriber identity module (SIM), or a universal subscriber identity module (USIM). Specifically, the identity module can include a module for identifying or authenticating authority for a broadcast purchase and/or broadcast viewing using the terminal 100.

A device provided with the identity module, referred to as an identity device, can be manufactured as a smart card. The identity device can be connected to the terminal 100 via a port for connecting the identity device.

The output unit 150 may include various components that support the output requirements of the mobile terminal 100. The display 151 may be implemented to visually display information associated with the mobile terminal 100.

In one example, the display 151 may provide a user interface or graphical user interface that includes information associated with placing, conducting, and terminating a phone call if the mobile terminal 100 is operating in a phone call mode. As another example, the display 151 may additionally or alternatively display images that are associated with a video call mode or a photographing mode.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151. An example of a two-display embodiment is one in which one display 151 is configured as an internal display viewable when the terminal is in an opened position and a second display 151 configured as an external display viewable in both the open and closed positions.

A proximity sensor (not shown) can be provided within the touch screen or around the touch screen. Alternatively, the proximity sensor can be provided within the sensing unit 140.

The proximity sensor is a sensor that detects a presence or absence of an object approaching a prescribed detecting surface or an object existing around the proximity sensor using an electromagnetic field strength or infrared ray without mechanical contact. Therefore, the proximity sensor has longer durability than a contact type sensor and also has wider utility than the contact type sensor. The proximity sensor can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, or an infrared proximity sensor.

For example, in a radio frequency oscillation proximity sensor, if an object approaches in the vicinity of the sensor detecting surface while an oscillation circuit is oscillating a full-wave radio frequency, the oscillation amplitude of the oscillation circuit attenuates or stops. This variation is converted to an electric signal in order to detect a presence or absence of the object. Therefore, the proximity sensor is able to detect a specific object without interference even if a substance other than a metallic substance is placed between the radio frequency oscillation proximity sensor and the object.

If the proximity sensor is provided with an electrostatic type touch screen, the proximity sensor can be configured to detect proximity of a pointer using a variation of an electric field according to the proximity of the pointer. In this way, the proximity sensor is able to detect the position of a pointer and the distance between the pointer and the touch screen if the pointer is located in the vicinity of the touch screen despite not contacting the touch screen.

For clarity, when a pointer approaches without contacting the touch screen and is recognized as located on the touch screen, this is named 'proximity touch'. When the pointer actually touches the touch screen is called a 'contact touch'. The position on the touch screen that is proximity-touched by the pointer refers to the position of the pointer which vertically opposes the touch screen when the pointer performs the proximity touch.

The proximity sensor detects a proximity touch and a proximity touch pattern such as a proximity touch distance, a proximity touch duration, a proximity touch position, or a proximity touch shift state. Information corresponding to the detected proximity touch and the detected proximity touch pattern can be output to the touch screen.

FIG. 1 further illustrates the output unit 150 having an audio output module 152, which supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode. The audio output module 152 outputs audio relating to a particular function or status, such as call received, message received, or errors.

The output unit 150 is further illustrated having an alarm 153, which may signal or otherwise identify the occurrence of a particular event associated with the mobile terminal 100. Typical events include call received, message received and user input received.

An example of a signal provided by the output unit 150 is a tactile sensation. For example, the alarm 153 may be configured to vibrate responsive to the mobile terminal 100 receiving a call or message. As another example, vibration may be provided by the alarm 153 responsive to receiving user input at the mobile terminal 100 in order to provide a tactile feedback mechanism. It is understood that the various signals provided by the components of output unit 150 may be separately performed or performed using any combination of the components.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

The memory 160 illustrated in FIG. 1 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, and other similar memory or data storage devices.

The memory 160 may store map data for searching and guiding the travel route of the mobile terminal 100 if the mobile terminal is mounted in a mobile object. The mobile object may not only be mobile means, such as a passenger car, subway or bicycle that can be mounted with the mobile terminal 100 or into which a user holding the mobile terminal may be located, but also may be a user when the user holds the mobile terminal and moves.

The controller 180 typically controls the overall operations of the mobile terminal 100. For example, the controller 180 performs the control and processing associated with voice calls, data communications, instant message communication, video calls, camera operations and recording operations. The controller 180 is able to perform pattern recognition processing for recognizing a handwriting input performed on the touch screen as a character or recognizing a picture drawing input performed on the touch screen as an image The controller 180 may include a multimedia module 181 that provides multimedia playback. The multimedia module 181 may be configured as part of the controller 180 or implemented as a separate component.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. The controller 180 may also implement such embodiments.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However, such teachings apply equally to other types of mobile terminals 100.

Figure 2A:
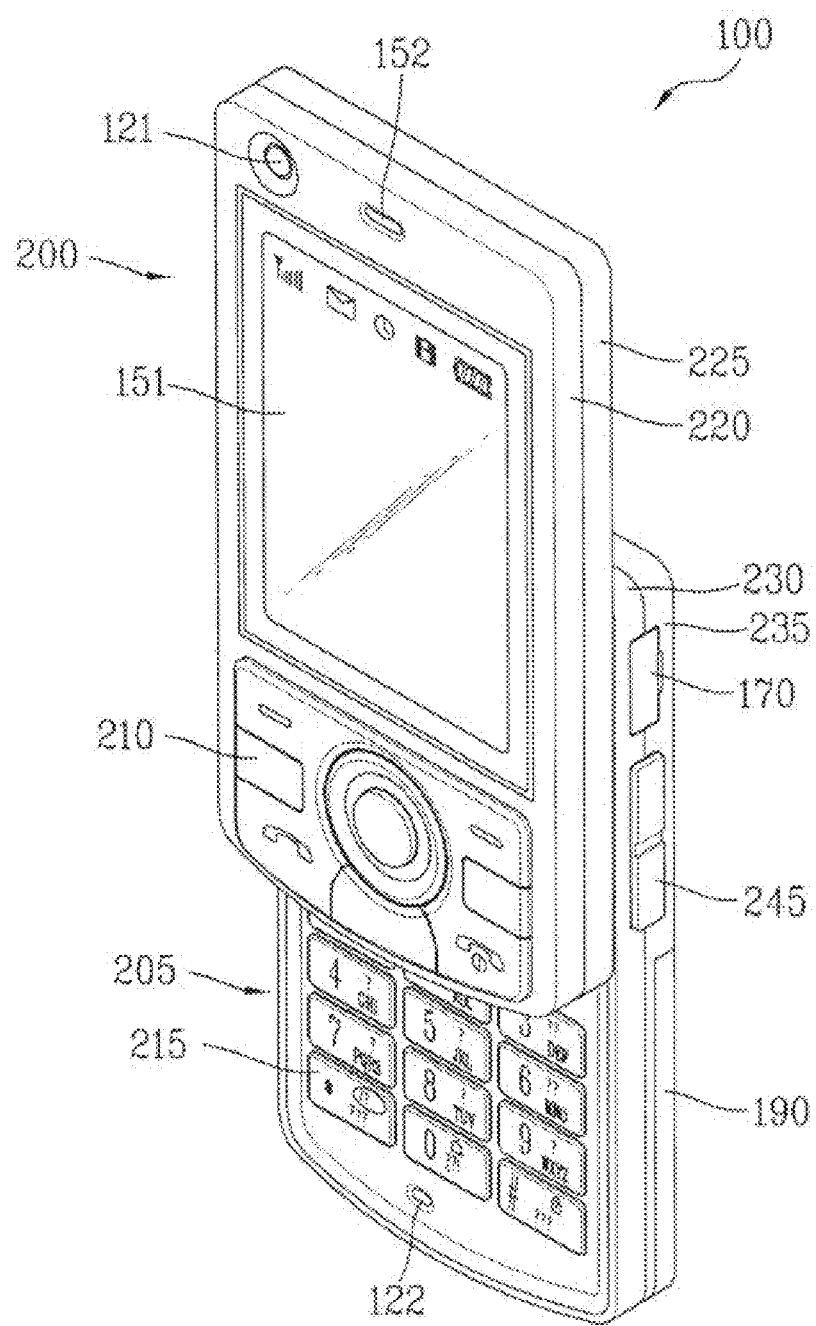
FIG. 2A illustrates a perspective view of a front side of a mobile terminal according to an embodiment of the present invention.

FIG. 2A is a perspective view of a front side of a mobile terminal 100 according to an embodiment of the present invention. In FIG. 2A, the mobile terminal 100 is illustrated having a first body 200 configured to slidably cooperate with a second body 205.

The user input unit 130 (described in FIG. 1) is implemented using function keys 210 and a keypad 215. The function keys 210 are located on the first body 200 and the keypad 215 is located on the second body 205. The keypad 215 includes various keys, such as numbers, characters, and symbols to enable a user to place a call, prepare a text or multimedia message, or otherwise operate the mobile terminal 100.

The user input unit 130 may be implemented using one or more dome switches or touch pads that can receive a user command or information according to a press or touch operation by the user. The user input unit 130 may also be implemented using a mechanical manipulation means, such as a rotatable element, such as a wheel, dial, jog button, or thumbwheel, or a linear element, such as a joystick, lever, or knob.

The first body 200 slides relative to the second body 205 between open and closed positions. The first body 200 is positioned over the second body 205 in the closed position such that the keypad 215 is substantially or completely obscured by the first body. User access to the keypad 215, the display 151 and the function keys 210 is facilitated in the open position. The function keys 210 are conveniently configured for a user to enter commands, such as start, stop and scroll.

The mobile terminal 100 is operable in either a standby mode or an active call mode. The mobile terminal 100 is able to receive a call or message and to receive and respond to network control signaling in the standby mode.

The mobile terminal 100 typically operates in the standby mode in the closed position and in the active mode in the open position. This mode configuration may be changed as required or desired.

The first body 200 is illustrated as formed of a first case 220 and a second case 225. The second body 205 is illustrated as formed of a first case 230 and a second case 235. The front case 220 and second case 225 of the first body 200 and the first case 230 and second case 235 or the second body 205 are usually formed of a suitably rigid material, such as injection molded plastic, or formed using metallic material, such as stainless steel (STS) and titanium (Ti).

One or more intermediate cases may be provided between the first case 220 and second case 225 of the first body 200 or between the first case 230 and second case 235 of the second body 205. The first body 200 and second body 205 are typically sized to receive electronic components necessary to support operation of the mobile terminal 100.

The first body 200 is illustrated as having a camera 121 and audio output module 152, which is configured as a speaker positioned relative to the display 151. The camera 121 may be constructed such that it can be selectively positioned relative to first body 200 by rotation or swiveling.

The function keys 210 are positioned adjacent to a lower side of the display 151, which is shown implemented as an LCD or OLED. The display 151 may also be configured as a touch screen having an underlying touchpad which generates signals responsive to user contact with the touch screen with a finger or stylus.

The second body 205 is illustrated as having a microphone 122 positioned adjacent to the keypad 215 and having side keys 245, which are one type of user input unit, positioned along the side of the second body. Preferably, the side keys 245 are configured as hot keys associated with a particular function of the mobile terminal 100.

An interface unit 170 is illustrated as positioned adjacent to the side keys 245. A power supply 190 in a form of a battery is illustrated as located on a lower portion of the second body 205.

Figure 2B:
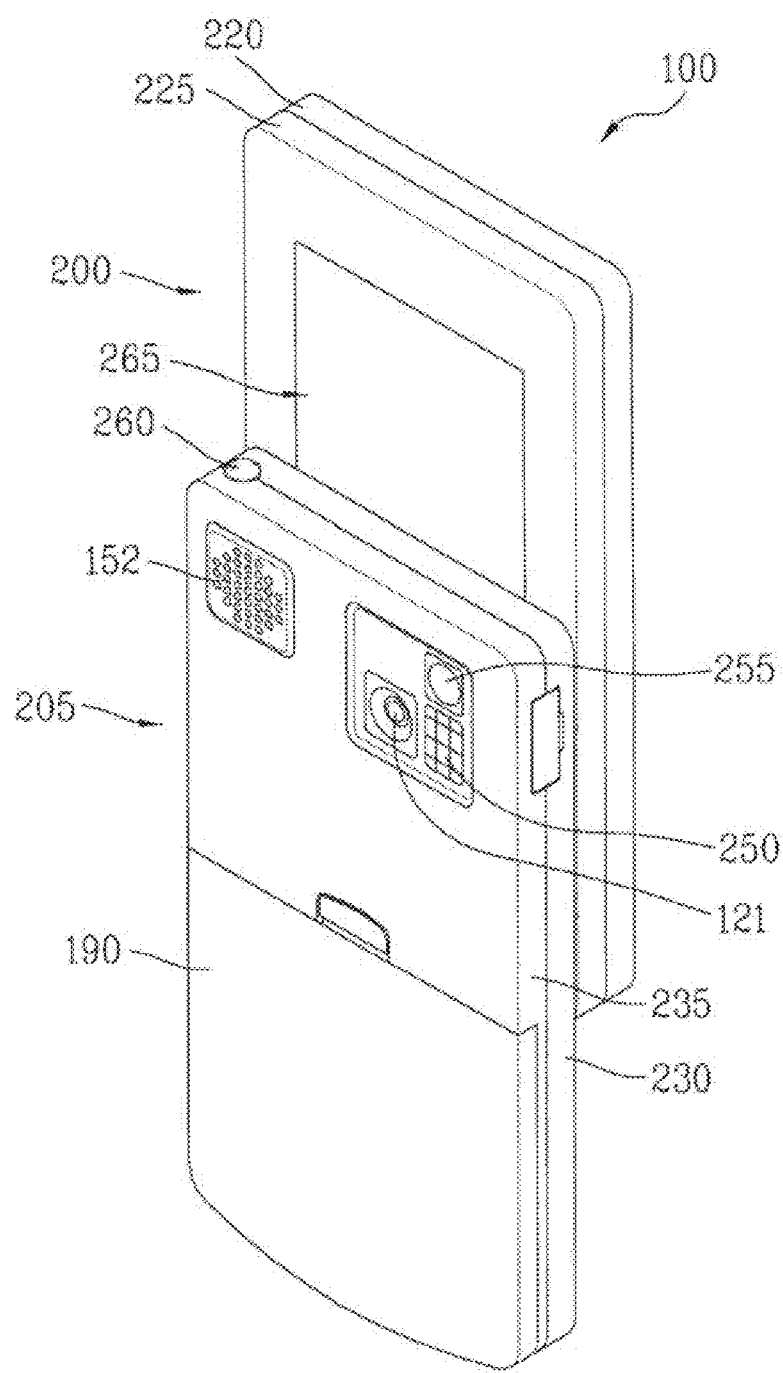
FIG. 2B illustrates a rear view of the mobile terminal illustrated in FIG. 2A.

FIG. 2B is a rear view of the mobile terminal illustrated in FIG. 2A. FIG. 2B illustrates the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 illustrated in FIG. 2B faces a direction opposite to a direction faced by the camera 121 of the first body 200 illustrated in FIG. 2A. Each of the cameras 121 of the first body 200 and second body 205 may have the same or different capabilities.

The camera 121 of the first body 200 in one embodiment operates with a relatively lower resolution than the camera 121 of the second body 205. Such an arrangement works well during a videoconference, for example, in which reverse link bandwidth capabilities may be limited. The relatively higher resolution of the camera 121 of the second body 205 is useful for obtaining higher quality pictures for later use or for communicating with other parties.

The second body 205 illustrated in FIG. 2B also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is illustrated as located at an upper end of the second body 205 in FIG. 2B. The antenna 260 functions in cooperation with the broadcast receiving module 111 illustrated in FIG. 1. The antenna 260 may be fixed or retractable into the second body 205.

The rear side of the first body 200 includes a slide module 265. The slide module 265 slidably couples with a corresponding slide module located on the front side of the second body 205.

It is understood that the arrangement of the various components of the first body 200 and second body 205 illustrated in FIGS. 2A and 2B may be modified as required or desired. For example, some or all of the components of one body may alternatively be implemented on the other body. Further, the location and relative positioning of the components are not critical and, therefore, the components may be positioned at locations that differ from those illustrated in FIGS. 2A and 2B.

Figure 3A:
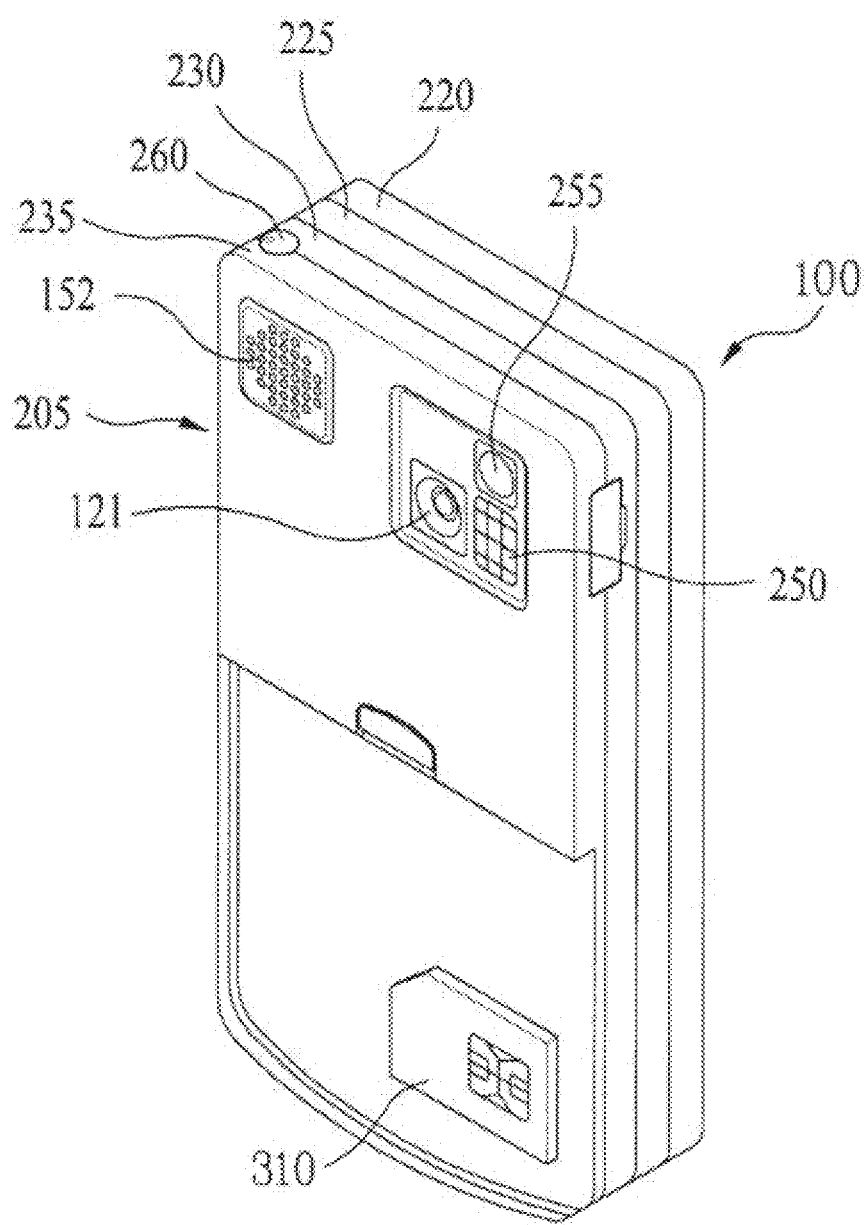
FIG. 3A and FIG. 3B are perspective diagrams illustrating an identity device that is detached from a terminal according to one embodiment of the present invention.
Figure 3B:
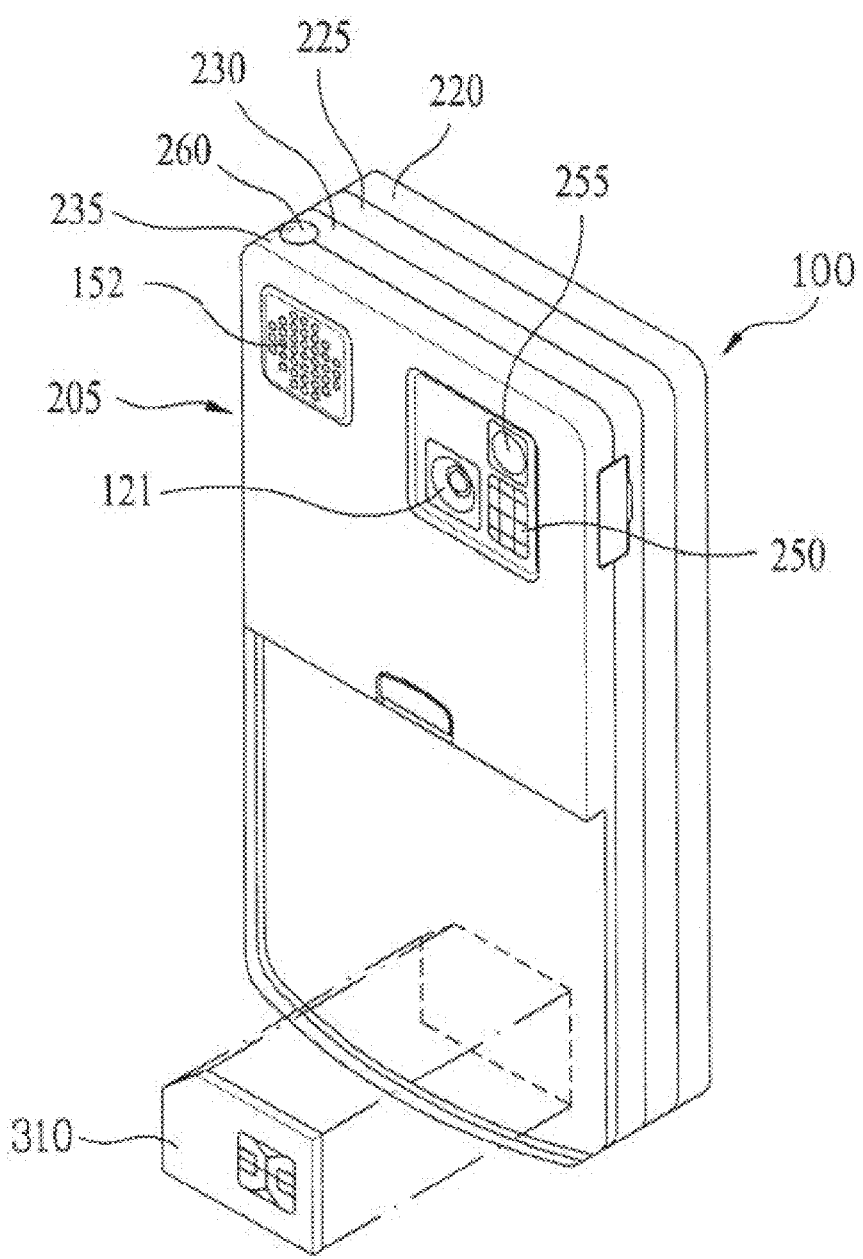

FIG. 3A and FIG. 3B illustrate an identity device 310 that is detached from a mobile terminal 100 according to one embodiment of the present invention. The identity device 310 can include an SIM card.

Referring to FIG. 3A and FIG. 3B, the identity device 310 is detachably connected to the mobile terminal 100. Therefore, a new identity device 310 can be loaded in the mobile terminal 100 by replacing an old identity device. Optionally, the identity device 310 can be combined with the interface unit 170.

The identity device 310 can be connected to the mobile terminal 100 by a connector separately provided for connection of the identity device. A connecting means (not shown) for connecting the identity device 310 to the mobile terminal 100 can be provided on the backside, lateral sides, or front side of the mobile terminal 100.

The mobile terminal 100 can be configured to operate in a wire/wireless communication system, a satellite based communication system or a communication system capable of transmitting data carried on frames or packets. The mobile terminal 100 may be configured to operate within a communication system which transmits data via frames or packets, including both wireless and wireline communication systems, and satellite-based communication systems. Such communication systems utilize different air interfaces and/or physical layers.

Examples of air interfaces utilized by the communication systems include frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
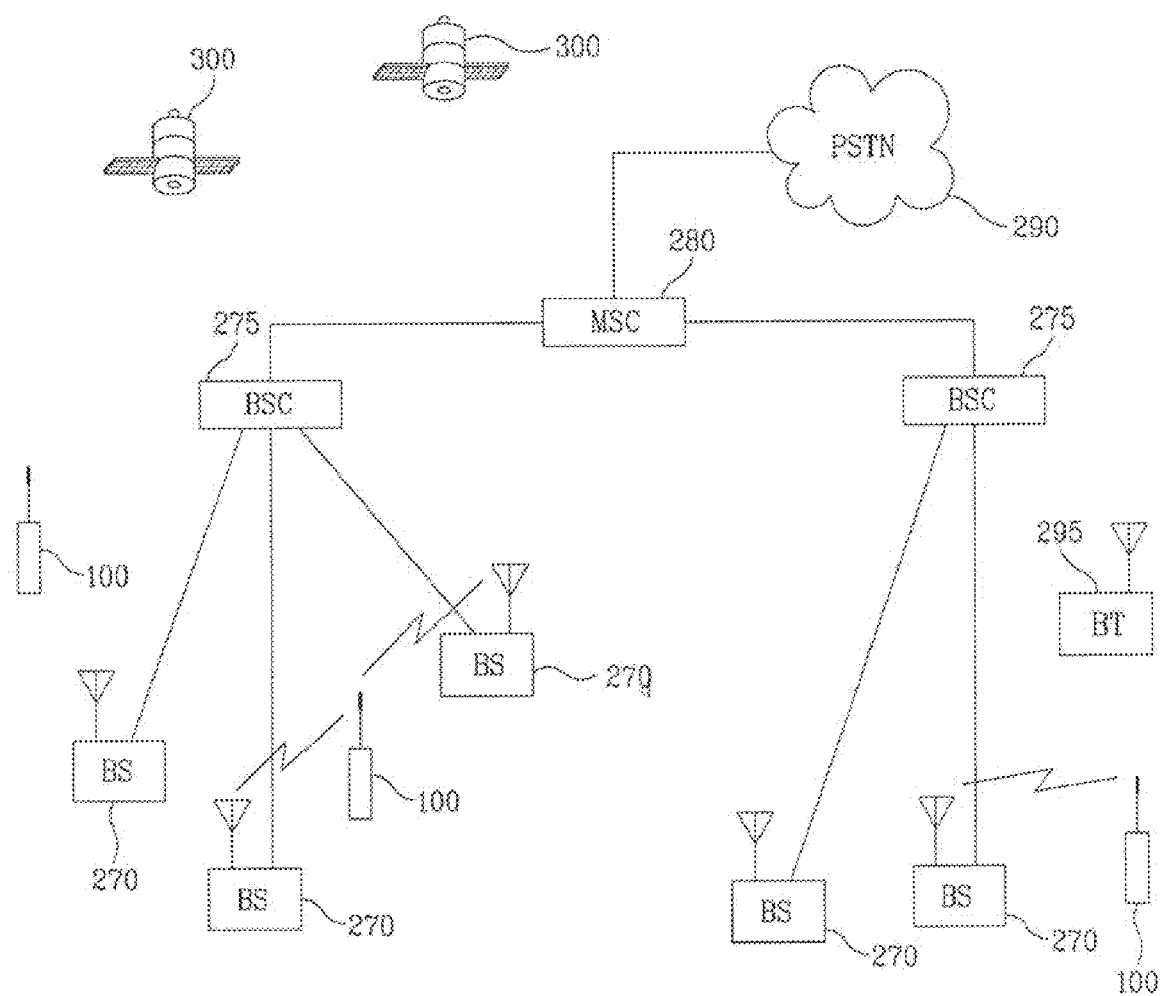
FIG. 4 is a block diagram of a CDMA wireless communication system operable with the mobile terminal of the present invention.

Referring to FIG. 4, a CDMA wireless communication system includes a plurality of mobile terminals 100, a plurality of base stations (BS) 270, base station controllers (BSCs) 275, and a mobile switching center (MSC) 280. The MSC 280 is configured to interface with a conventional public switch telephone network (PSTN) 290 and is also configured to interface with the BSCs 275. The BSCs 275 are coupled to the base stations 270 via backhaul lines that may be configured according to any of several known interfaces including, E1/T1, ATM, IP, PPP, Frame Relay, HDSL, ADSL, and xDSL. The system may include more than two BSCs 275.

Each BS 270 may include one or more sectors, each sector having an omni-directional antenna or an antenna pointed in a particular direction radially away from the base station. Alternatively, each sector may include two antennas for diversity reception. Each BS 270 may be configured to support a plurality of frequency assignments, with each frequency assignment having a particular spectrum, such as 1.25 MHz or 5 MHz.

The intersection of a sector and frequency assignment may be referred to as a CDMA channel. The BS 270 may also be referred to as base station transceiver subsystems (BTSs).

In some cases, the term "base station" may be used to refer collectively to a BSC 275, and one or more BS 270. The BS 270 may also be denoted "cell sites." Alternatively, individual sectors of a given BS 270 may be referred to as "cell sites."

A terrestrial digital multimedia broadcasting (DMB) transmitter (BT) 295 broadcasts to the mobile terminals 100 operating within the system. The broadcast receiving module 111 shown in FIG. 1 is typically configured to receive broadcast signals transmitted by the BT 295. Similar arrangements may be implemented for other types of broadcast and multicast signaling discussed above.

FIG. 4 further depicts several global positioning system (GPS) satellites 300. Such satellites facilitate locating the position of some or all of the mobile terminals 100. While two GPS satellites 300 are depicted in FIG. 4, useful positioning information may be obtained with greater or fewer satellites depending on the situation.

The position-location module 115 shown in FIG. 1 is typically configured to cooperate with the GPS satellites 300 to obtain desired position information. Alternatively, other types of position detection technology, such as a location technology, may be used in addition to or instead of GPS location technology. If desired, some or all of the GPS satellites 300 may alternatively or additionally be configured to provide satellite DMB transmissions.

During typical operation of the wireless communication system, the BS 270 receives sets of reverse-link signals from various mobile terminals 100. The mobile terminals 100 engage in calls, messaging, and other communications.

Each reverse-link signal received by a given BS 270 is processed within that BS. The resulting data is forwarded to an associated BSC 275. The BSC 275 provides call resource allocation and mobility management functionality including the orchestration of soft handoffs between the BS 270.

The BSCs 275 also route the received data to the MSC 280 which provides additional routing services for interfacing with the PSTN 290. Similarly, the PSTN interfaces with the MSC 280, and the MSC interfaces with the BSCs 275, which in turn control the BS 270 to transmit sets of forward-link signals to the mobile terminals 100.

For clarity and convenience of the following description, it is assumed that the mobile terminal 100 in the following description includes at least one of the elements illustrated in FIG. 1. The steps of a broadcast controlling method in a mobile terminal 100 according to the present invention are explained with reference to FIG. 5.

Figure 5:
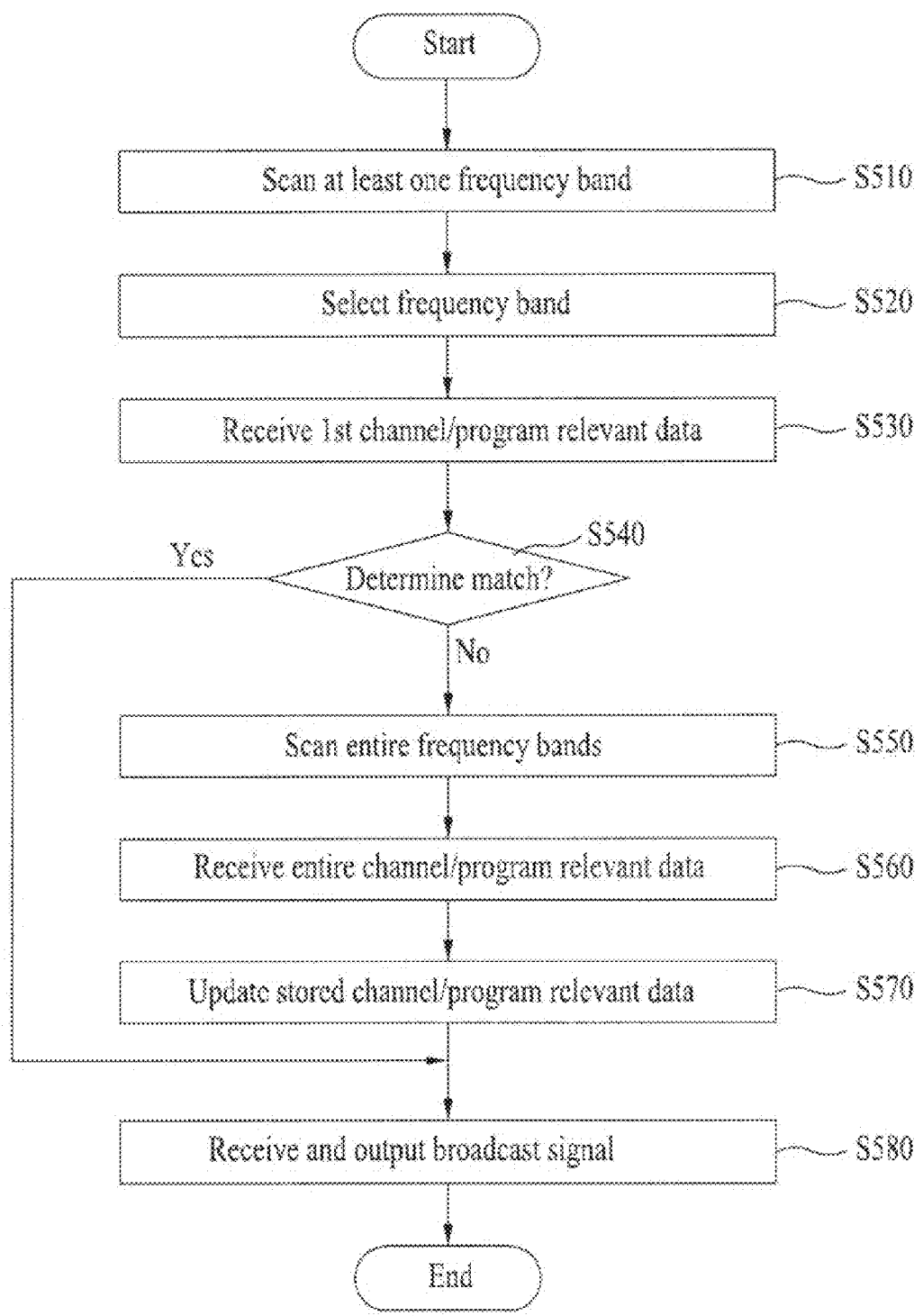
FIG. 5 illustrates a method of controlling a broadcast in a mobile terminal according to one embodiment of the present invention.

FIG. 5 illustrates a method of controlling a broadcast in a mobile terminal 100 according to one embodiment of the present invention. As illustrated in FIG. 5, the mobile terminal 100 scans at least one frequency band using the wireless communication unit 110, and, specifically the broadcast receiving module 111 (S510). The mobile terminal 100 can include a separate element (not shown) for performing a frequency band scanning operation.

A frequency band is assigned to provide a broadcast signal to the mobile terminal 100. A plurality of frequency bands can be assigned and at least one channel can be assigned to each of a plurality of the frequency bands.

A channel means a broadcast channel. The frequency band in DVB-T can be called a channel and the channel can be called a service. It is understood that the terms 'frequency band' and 'channel' may be replaced by other terms having the same meanings.

Figure 11A:
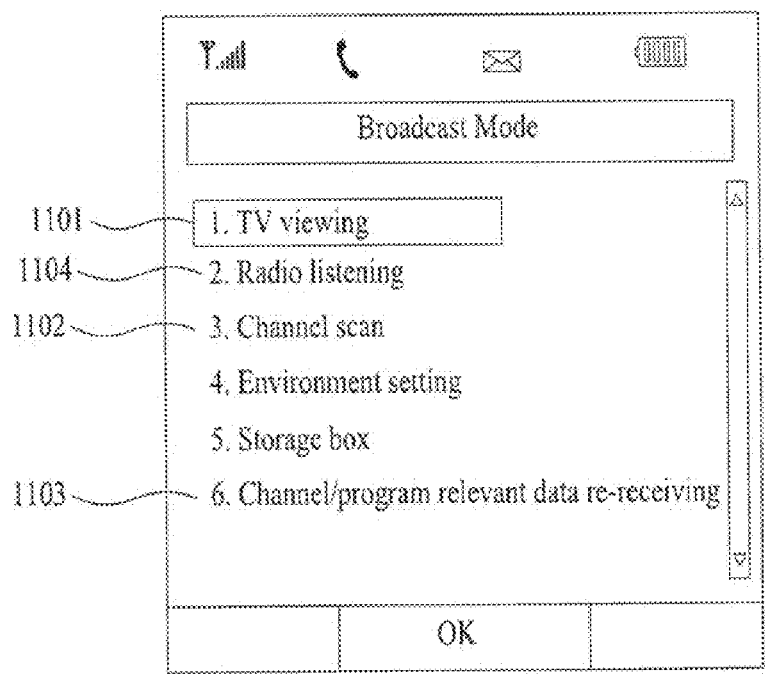
FIG. 11A illustrates a screen configuration for a broadcast mode entry according to one embodiment of the present invention.

The scanning operation (S510) can be performed if a menu item such as 'Channel scan', corresponding to a scanning operation command for a frequency band is selected by a user through a menu search. For example, the scanning operation (S510) can be performed if 'Channel scan' 1102 is selected from the menu item list illustrated in FIG. 11A.

For example, if a user selection of 'Channel scan' 1102 is input via the user input unit 130, the wireless communication unit 110 scans all frequency bands according to a control signal from the controller 180 that corresponds to the user selection. This is called 'full scan'.

The scanning operation (S510) can be performed if a menu item corresponding to a broadcast mode entry command is selected through a menu search or if a key separately provided for a broadcast mode entry command is selected. This can be performed if 'TV viewing' 1101 or 'Radio listening' 1104 is selected from the menu item list illustrated in FIG. 11A.

For example, if a user selection of 'TV viewing' 1101 or a separate key to generate a command for 'TV viewing' is input via the user input unit 130, the wireless communication unit 110 scans all frequency bands or at least one frequency band, or 'previously used frequency band', to which at least one previously used channel is assigned. The operation is performed according to a control signal from the controller 180 that corresponds to the user selection.

Figure 11B:
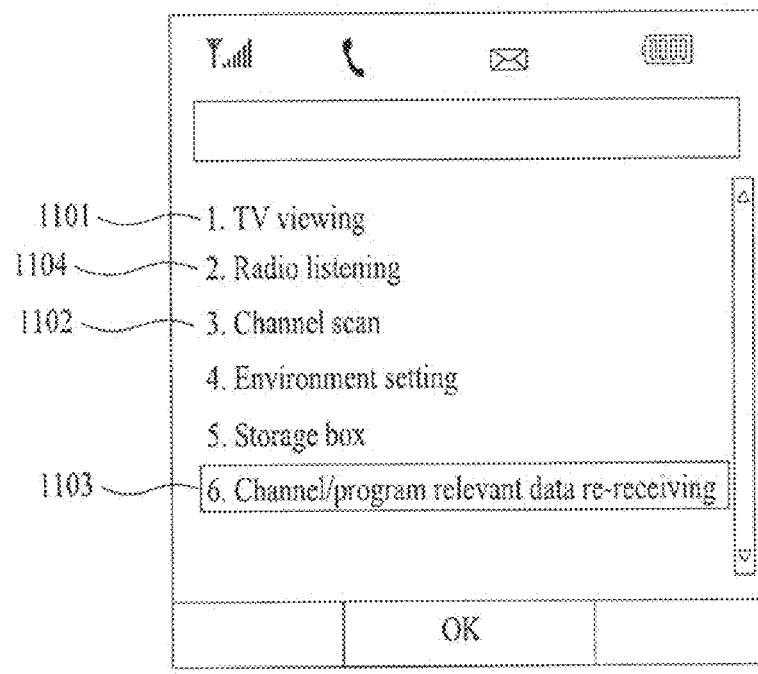
FIG. 11B illustrates a screen configuration for a user selection input according to one embodiment of the present invention.

Alternatively, the scanning operation (S510) can be performed if a menu item for a channel/program relevant data re-receiving command is selected via a menu search. This can be performed when 'Channel/program relevant data re-receiving' 1103 is selected from the menu item list illustrated in FIG. 11B.

For example, if a user selection of 'Channel/program relevant data' re-receiving 1103 is input via the user input unit 130, the wireless communication unit 110 scans all frequency bands or previously used frequency bands according to a control signal that corresponds to the user selection. Alternatively, the scanning operation (S510) can be performed when broadcast signal reception is degraded lower than a predetermined reference in the course of outputting broadcast signals.

Figure 11C:
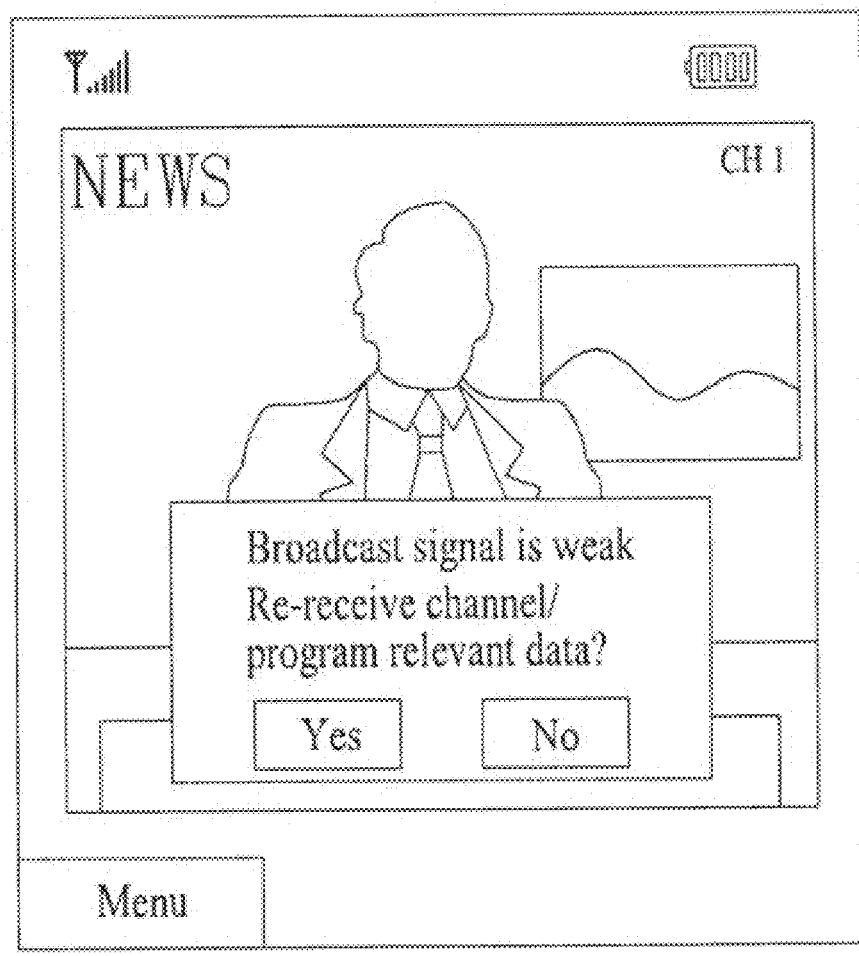
FIG. 11C illustrates a screen configuration for an unavailable broadcast viewing in a mobile terminal according to one embodiment of the present invention.

For example, when broadcast signal reception degradation occurs, the mobile terminal 100 informs a user of the broadcast signal reception degradation via the output unit 150, as illustrated in FIG. 11C. Specifically, a window is displayed via the display unit 151 to enable the user to select whether to re-receive the channel/program relevant data. The mobile terminal 100 scans frequency bands or the previously used frequency bands using the wireless communication unit 110 if the user selects 'Yes'.

In the scanning operation for the previously used frequency bands, the wireless communication unit 110 sequentially scans all previously used frequency bands for a predetermined period of time. Alternately, the wireless communication unit 110 can scan a specific frequency among all previously used frequency bands for a predetermined period of time.

For example, the specific frequency band can include a frequency band to which a last used channel is assigned, a frequency band to which a user-selected channel is assigned, a frequency band selected by a user, a frequency band having a highest use frequency/rate or a frequency band having a highest preference. In the following description, the specific frequency band is designated as the frequency band to which the last used channel is assigned for clarity and convenience of explanation.

For example, if all previously used frequency bands are unavailable, the wireless communication unit 110 scans all frequency bands according to a control signal from the controller 180. Alternatively, the wireless communication unit 110 scans all frequency bands or all the previously used frequency bands according to a control signal from the controller 180 if a specific previously-used frequency band, such as a frequency band to which a last used channel is assigned, is unavailable.

Figure 12A:
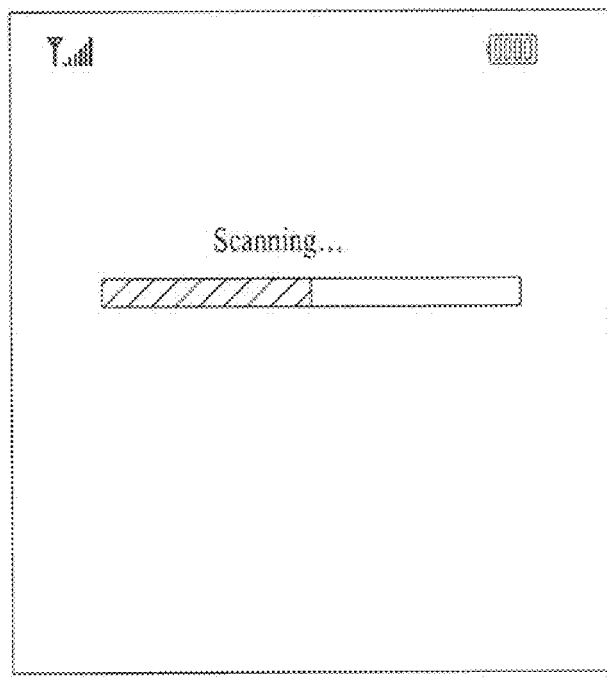
FIG. 12A illustrates a screen configuration for a frequency scan in a mobile terminal according to one embodiment of the present invention.

While the scanning operation (S510) is performed, the mobile terminal 100 displays an identifier via the display unit 151 to indicate that a current frequency band scan is in progress or to indicate a scan extent, as illustrated in FIG. 12A. The identifier may be an icon, image, a moving picture, an emoticon, a symbol, text, or a progression bar.

Information obtained from the scanning operation (S510) can be stored in the memory 160 according to a control signal from the controller 180. After the scanning operation (S510), the mobile terminal 100 selects a frequency band (S520) and receives first channel/program relevant data provided via the selected frequency band using the wireless communication unit 110 (S530).

The channel/program relevant data is data required for reception and output of a broadcast program provided on a corresponding channel. For example, the channel/program relevant data can include time relevant data for providing per-country/region time information such as TOT (time offset table) of DVB-T, network relevant data for providing broadcast network relevant information such as NIT (network information table), channel relevant data for providing information on a broadcast channel such as SDT (service description table), program relevant data for providing information on a channel and a program configuring the channel such as PAT (program association table), or PMT (program map table).

FIGS. 6 to 10 illustrate channel/program relevant data including TOT, NIT, SDT, PAT and PMT. The first channel/program relevant data can include at least one of this data.

Specifically, the entire channel/program relevant data includes all data required for the broadcast reception and output as well as the previously identified data. The first channel/program relevant data can refer to a specific one of the entire channel/program relevant data.

The first channel/program relevant data can include a unique identification value for identifying the first channel/program relevant data from other channel/program relevant data. For example, if the identification value is a packet ID (PID), each of the channel/program relevant data can have a unique PID. The mobile terminal 100 is able to check whether the received channel/program relevant data is the first channel/program relevant data by using the identification value of the corresponding channel/program relevant data.

For example, PID of TOT is set to 20, PID of NIT is set to 16, PID of SDT is set to 17, and PID of PAT is set to 0 in DVB-T. Therefore, if the first channel/program relevant data is NIT, the mobile terminal 100 is able to only select channel/program relevant data having the PID of 16 from the entire channel/program relevant data provided on the selected frequency band (S520).

The first channel/program relevant data can include unique information corresponding to the selected frequency band (S520). For example, the NIT on a first frequency band can include information different from the information of the NIT on a second frequency band if the first channel/program relevant data is NIT.

For TOT, unique information on a frequency band may not be included. This is because the per-country/region time information included in the TOT has nothing to do with the frequency band.

Subsequently, the mobile terminal 100 determines whether the first channel/program relevant data received (S530) matches the first channel/program relevant data previously stored in the memory 160 (S540). The determination of a match (S540) can be performed by the controller 180. The mobile terminal 100 is able to use the identification information included in the first channel/program relevant data to make the determination (S540).

For example, at least country identification information for identifying a country or time zone identification information for identifying a time zone per region is usable if the first channel/program relevant data is time relevant data such as TOT. In the TOT illustrated in FIG. 6, 'country_code' and 'country_region_id' can correspond to, respectively, the country identification information and the time zone identification information. Therefore, the mobile terminal 100 is able to determine its international location shift according to whether the country identification information matches and is also able to determine its interregional location shift between regions differing in time zone according to whether the time zone identification information matches.

Alternatively, at least network identification information for identifying a broadcast network or transport stream identification information for identifying information provided per channel is usable if the channel/program relevant data is network relevant data such as NIT. In the NIT illustrated in FIG. 7, 'network_id' and 'transport_stream_id' can correspond to, respectively, the network identification information and the transport stream identification information, respectively. Therefore, the mobile terminal 100 is able to determine a broadcast network change according to whether the network identification information matches and is also able to determine a channel switching according to whether the transport stream identification information matches.

Alternatively, at least channel identification information for identifying a broadcast channel or transport stream identification information is usable if the first channel/program relevant data is channel relevant data such as SDT. In the SDT illustrated in FIG. 8, 'service_id' and 'transport_stream_id' can correspond to, respectively, the channel identification information and the transport stream identification information. Therefore, the mobile terminal 100 is able to determine a channel switching according to whether the channel identification information matches or the transport stream identification information matches.

Alternatively, at least channel identification information, program identification information for identifying a broadcast program or program configuration signal identification information for identifying video, audio and data signals configuring the broadcast program is usable if the first channel/program relevant data is program relevant data such as PAT or PMT. In the PAT illustrated in FIG. 9, 'transport_stream_id' corresponds to the program identification information and 'program_number' or 'program_map_PID' may correspond to the program identification information. In the PMT illustrated in FIG. 10, 'stream_type' or 'elementary_PID' can correspond to the program configuration signal identification information. Therefore, the mobile terminal 100 is able to determine a broadcast program change of a specific channel according to whether the program configuration signal identification information matches.

Figure 12B:
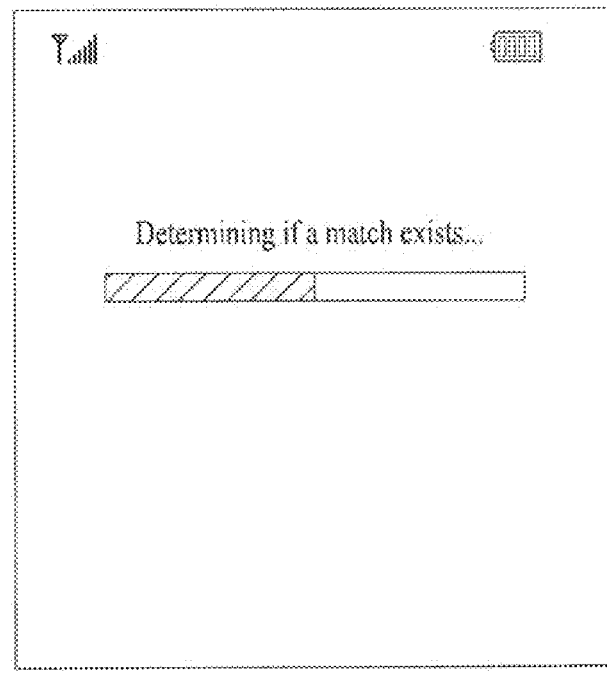
FIG. 12B illustrates a screen configuration for determining a presence or absence of channel/program relevant data matching in a mobile terminal according to one embodiment of the present invention.

While performing the determination (S540), the mobile terminal 100 displays an identifier via the display unit 151 to indicate that a determination of a match of the first channel/program relevant information is in progress or an identifier indicating an extent of the determination, as illustrated in FIG. 12B. The identifier may be an icon, an image, a moving picture, an emoticon, a symbol, text, or a progression bar.

The absence of a match of the first channel/program relevant data according to the determination (S540) indicates a location change of the mobile terminal 100, a channel switching per frequency band of the mobile terminal, or a program change per channel of the mobile terminal. This may mean that broadcast viewing via the mobile terminal 100 is not available. In the absence of a match of the first channel/program relevant data, it is necessary to update the channel/program relevant data previously stored in the memory 160 entirely or in part in order to smoothly perform broadcast viewing via the mobile terminal 100 at a current location.

Upon determining the absence of a match as a result of the determination (S540), the mobile terminal 100 scans entire frequency bands using the broadcast relieving module 111 or an element (not shown) separately provided for the frequency band scan (S550). The entire frequency bands may refer to all the frequency bands assigned to provide broadcast signals to the mobile terminal 100.

Subsequently, the mobile terminal 100 receives entire channel/program relevant data using the wireless communication unit 110 (S560) as a result of the scan of entire frequency bands. As mentioned in the foregoing description, entire channel/program relevant data is acquired through the scan performed on the entire frequency bands since the channel/program relevant data may include information differing according to frequency band. Receiving entire channel/program relevant data (S560) can be performed by the broadcast receiving module 111 or the element (not shown) separately provided for the frequency band scan according to a control signal from the controller 180.

With reference to the received entire channel/program relevant data (S560), the mobile terminal 100 updates the entire or partial first channel/program relevant data previously stored in the memory 160 (S570). For example, the updating operation (S570) can be performed by the controller 180.

The updating operation (S570) can be performed upon receiving an operation corresponding to an update command from a user or according to a determination made by the mobile terminal 100. Alternatively, the update operation (S570) can be automatically performed upon receiving the entire channel/program relevant data.

Figure 13A:
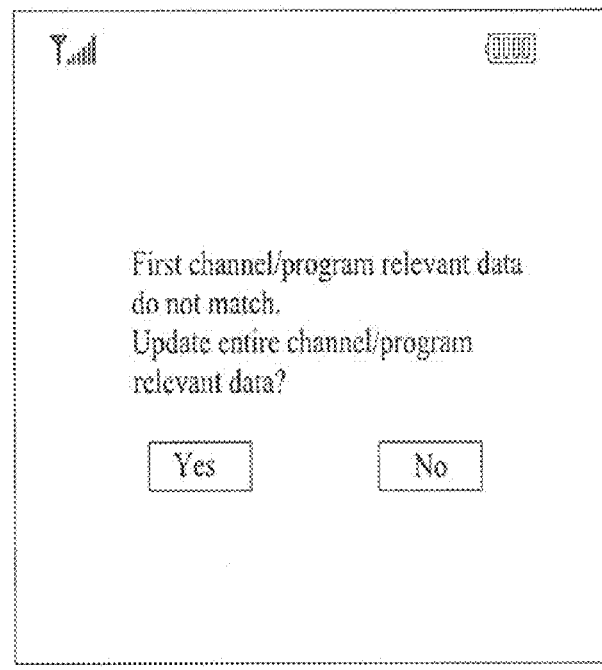
FIGS. 13A to 13D illustrate screen configurations for an absence of channel/program relevant data matching in a mobile terminal according to one embodiment of the present invention.

For example, once the entire channel/program relevant data is received (S560), the mobile terminal 100 outputs text to the display unit 151 for querying whether to update the previously stored channel/program relevant data with reference to the received entire channel/program relevant data, as illustrated in FIG. 13A. If a user selects to update the entire channel/program relevant data by selecting 'Yes', the mobile terminal 100 performs the update operation (S570).

Figure 13B:
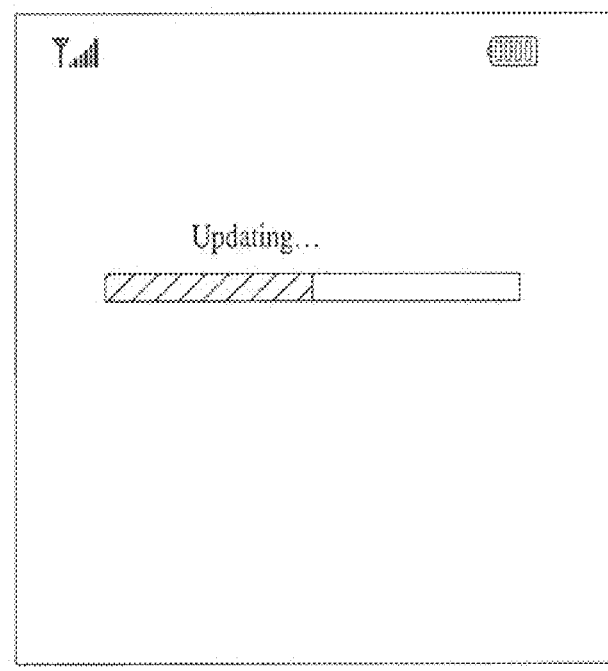

While performing the update operation (S570), the mobile terminal 100 displays an identifier on the display unit 151 to indicate that the update of the channel/program relevant information is in progress or an identifier indicating an extent of the update, as illustrated in FIG. 13B. The identifier may be an icon, an image, a moving picture, an emoticon, a symbol, text, or a progression bar.

Figure 13C:
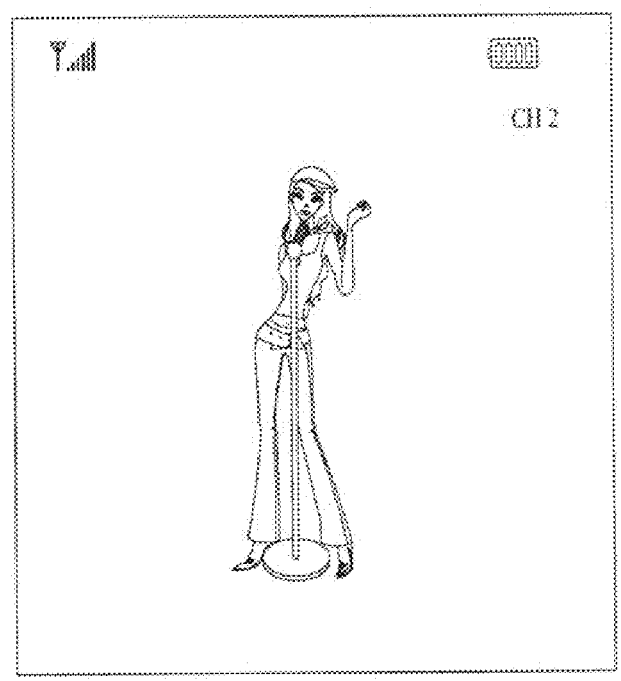
Figure 13D:
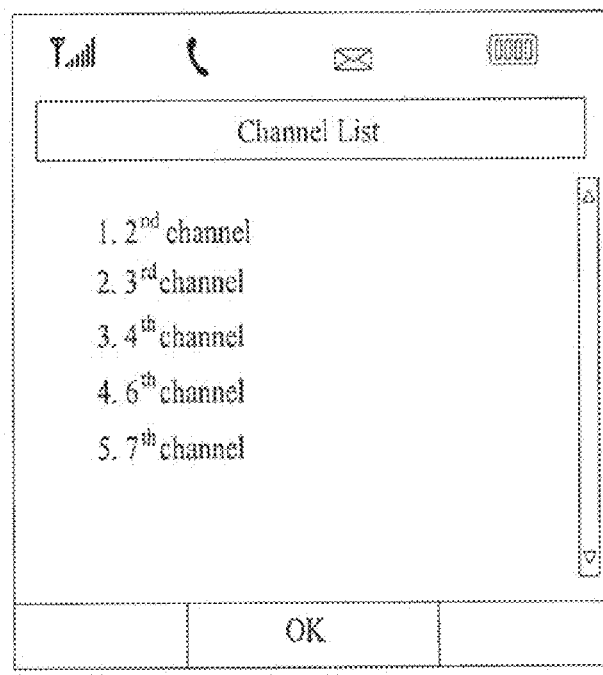

Subsequently, the mobile terminal 100 receives and outputs a broadcast signal provided on a specific broadcast channel using the updated channel/program relevant data (S580). For example, the mobile terminal 100 outputs a broadcast signal received on a broadcast channel selected by a user or a broadcast signal received on a broadcast channel randomly selected by the mobile terminal 100, as illustrated in FIG. 13C. The mobile terminal 100 displays a channel list with reference to the updated channel/program relevant data if a user selects a menu item corresponding to 'channel list view', as illustrated in FIG. 13D.

Figure 14A:
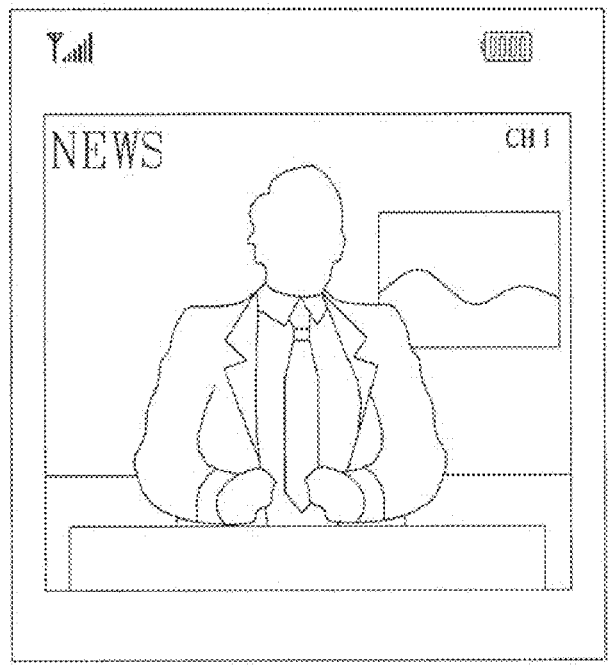
FIGS. 14A to 14C illustrate screen configurations for a presence of channel/program relevant data matching in a mobile terminal according to one embodiment of the present invention.
Figure 14B:
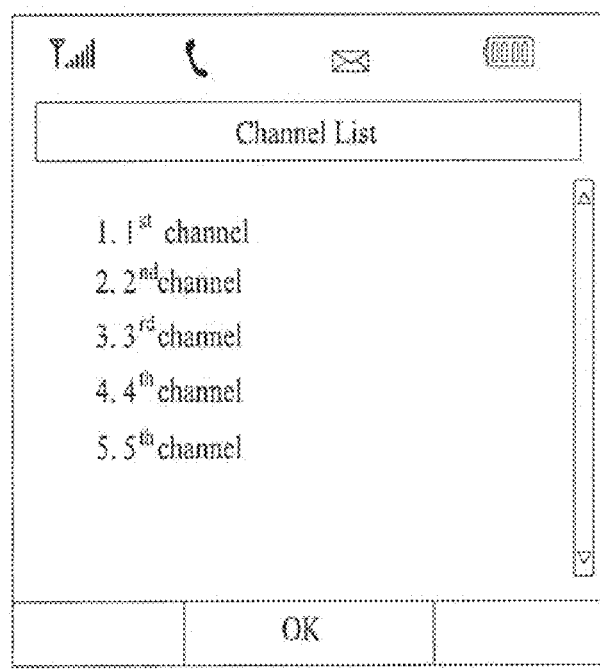

If the mobile terminal 100 determines a match (S540), the mobile terminal then receives and outputs a broadcast signal provided on a specific broadcast channel using the channel/program relevant data previously stored in the memory 160 (S580). For example, the mobile terminal 100 outputs a broadcast signal received on a broadcast channel selected by a user, a broadcast channel randomly selected by the mobile terminal 100 or a last used broadcast channel, as illustrated in FIG. 14A. If a user selects a menu item corresponding to 'channel list view', the mobile terminal 100 displays a channel list based on the previously stored channel/program relevant data, as illustrated in FIG. 14B.

Figure 14C:
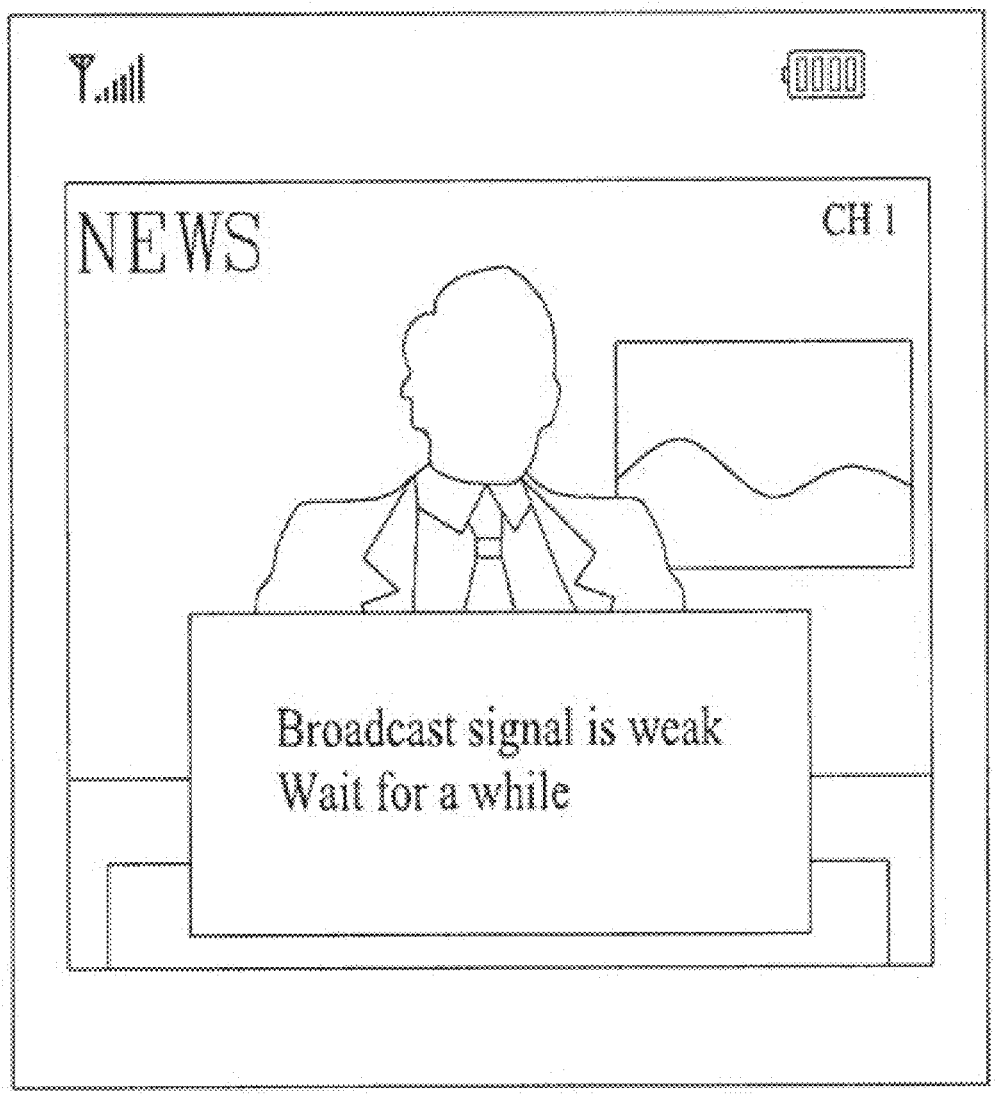

If broadcast viewing is impossible due to weak broadcast signal strength while outputting broadcast signals, as illustrated in FIG. 14C, the mobile terminal 100 sequentially performs the method illustrated in FIG. 5.

The method of controlling a broadcast in a mobile terminal according to the present invention can be implemented in a program recorded medium as computer-readable codes. The computer-readable media include all types of recording devices in which data readable by a computer system are stored.

The computer-readable media include ROM, RAM, CD-ROM, magnetic tapes, floppy discs, and optical data storage devices, and also include carrier-wave type implementations such as transmission via Internet. The computer can include the controller 180 of the mobile terminal 100.

The present invention provides several advantages. First, the present invention is able to update previously stored channel/program relevant data quickly and conveniently. Second, the present invention is able to determine whether to update entire channel/program relevant data by determining a presence or absence of matching partial data among previously stored channel/program relevant data, thereby providing convenience to a user because a one-by-one user selection operation is unnecessary.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Depending on implementation, it is possible that the present invention can take the form of an entirely hardware embodiment, an entirely software embodiment or an embodiment containing both hardware and software elements. A software embodiment may include, but not be limited to, firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices including, but not limited to, keyboards, displays, and pointing devices, can be coupled to the system either directly or through intervening I/O controllers. Network adapters, such as a modem, a cable modem, or an Ethernet card, may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to, any particular programming language, and may be comprise one or more modules that execute on one or more processors in a distributed, non-distributed, or multiprocessing environment.

The method as described herein may be used in the fabrication of integrated circuit chips. The resulting integrated circuit chips can be distributed by the fabricator in raw wafer form as a single wafer that has multiple unpackaged chips, as a bare die, or in a packaged form. In the latter case, the chip is mounted in a single chip package, such as a plastic carrier with leads that are affixed to a motherboard or other higher level carrier or in a multi-chip package, such as a ceramic carrier that has either or both surface interconnections of buried interconnections.

In any case, the chip is then integrated with other chips, discrete circuit elements, and/or other signal processing devices as part of either an intermediate product, such as a motherboard or an end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatus.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal having a broadcast receiving feature, the mobile terminal comprising:
    a memory for storing channel/program relevant data,
        wherein received first channel/program relevant data comprises at least time relevant data, network relevant data, channel relevant data or program relevant data, and
        wherein each of the time relevant data, the network relevant data, the channel relevant data and the program relevant data includes different identification information;
    a wireless communication unit for receiving first channel/program relevant data; and
    a controller for:
        determining whether the received first channel/program relevant data matches first channel/program relevant data stored in the memory, the determining using the different identification information included in the received first channel/program relevant data,
        controlling the wireless communication unit to receive entire channel/program relevant data if the received first channel/program relevant data does not match the stored first channel/program relevant data, and
        updating the stored first channel/program relevant data with reference to the received entire channel/program relevant data.

2. The mobile terminal of claim 1, wherein the wireless communication unit scans one or more frequency bands and the controller selects a frequency band for providing the first channel/program relevant data from the scanned one or more frequency bands.

3. The mobile terminal of claim 2, wherein the controller selects a first scanned frequency band, a frequency band having best signal strength or a user selected frequency band from the one or more scanned frequency bands.

4. The mobile terminal of claim 2, wherein the wireless communication unit scans a last frequency band to which a last used channel among one or more previously-used channels is assigned and the controller selects the last frequency band as the frequency band for providing the first channel/program relevant data if the last frequency band is available and the controller controls the wireless communication unit to scan one or more other frequency bands if the last frequency band is not available.

5. The mobile terminal of claim 2, wherein the wireless communication unit scans the one or more frequency bands to which at least one previously-used channel is assigned according to a control signal from the controller.

6. The mobile terminal of claim 5, wherein the controller controls the wireless communication unit to scan the entire frequency bands if the one or more frequency bands to which the at least one previously-used channel is assigned is not available.

7. The mobile terminal of claim 2, wherein the controller controls the wireless communication unit to perform a scan operation on the one or more frequency bands if at least broadcast mode entry, a user selection operation input or unavailable broadcast viewing is determined.

8. The mobile terminal of claim 1, wherein:
    the identification information includes at least country identification information or time zone identification information if the received first channel/program relevant data is time relevant data;
    the identification information includes at least network identification information or transport stream identification information if the received first channel/program relevant data is network relevant data;
    the identification information includes channel identification information or transport stream identification information if the received first channel/program relevant data is channel relevant data; and
    the identification information includes channel identification information, program identification information or program configuration data identification information, if the received first channel/program relevant data is program relevant data.

9. The mobile terminal of claim 1, wherein the wireless communication unit scans entire frequency bands and receives the entire channel/program relevant data according to a control signal from the controller if the received first channel/program relevant data does not match the stored first channel/program relevant data.

10. The mobile terminal of claim 1, further comprising a user input unit for receiving a selection from a user and wherein the controller determines whether to update the stored first channel/program relevant data according to the received user selection.

11. The mobile terminal of claim 1, wherein the received first channel/program relevant data includes unique information for a frequency band providing the first channel/program relevant data.

12. The mobile terminal of claim 1, wherein the received first channel/program relevant data includes a unique identification value for identifying the received channel/program relevant data.

13. A method of controlling a broadcast in a mobile terminal, the method comprising:
   receiving first channel/program relevant data in the mobile terminal,
      wherein the received first channel/program relevant data comprises at least time relevant data, network relevant data, channel relevant data or program relevant data, and
      wherein each of the time relevant data, the network relevant data, the channel relevant data and the program relevant data includes different identification information;
   determining whether the received first channel/program relevant data matches stored first channel/program relevant data, the determining using the different identification information included in the received first channel/program relevant data; and
   receiving entire channel/program relevant data if the received first channel/program relevant data does not match the stored first channel/program relevant data and updating the stored first channel/program relevant data with reference to the received entire channel/program relevant data.

14. The method of claim 13, further comprising:
   scanning one or more frequency bands; and
   selecting a frequency band for providing the first channel/program relevant data from the one or more scanned frequency bands.

15. The method of claim 14, wherein scanning the one or more frequency bands comprises scanning a last frequency band to which a last used channel among one or more previously-used channels is assigned, selecting the frequency band comprises selecting the last frequency band as the frequency band for providing the first channel/program relevant data if the last frequency band is available, and the method further comprises scanning one or more other frequency bands if the last frequency band is not available.

16. The method of claim 14, wherein scanning the one or more frequency bands comprises scanning at least one frequency band to which at least one previously-used channel is assigned.

17. The method of claim 16, further comprising:
   scanning the entire frequency bands if the at least one frequency band to which the at least one previously-used channel is assigned is not available.

18. The method of claim 14, wherein scanning the one or more frequency bands is performed upon detecting a broadcast mode entry, a user selection operation input or unavailable broadcast viewing.

19. The method of claim 13, wherein:
   the identification information includes at least country identification information or time zone identification information if the received first channel/program relevant data is time relevant data;
   the identification information includes at least network identification information or transport stream identification information if the received first channel/program relevant data is network relevant data;
   the identification information includes at least channel identification information or transport stream identification information if the received first channel/program relevant data is channel relevant data; and
   the identification information includes at least channel identification information, program identification information or program configuration data identification information if the received first channel/program relevant data is program relevant data.

20. The method of claim 13, further comprising scanning entire frequency bands if the received first channel/program relevant data does not match the stored first channel/program relevant data,
   wherein the entire channel/program relevant data are obtained as a result of scanning the entire frequency bands.

21. The method of claim 13, further comprising receiving a selection operation from a user, wherein updating the stored first channel/program relevant data comprises updating the stored first channel/program relevant data according to the received selection operation.

* * * * *